Aug. 4, 1936.        H. S. EBERHARD         2,049,643
                      MOTOR VEHICLE
                    Filed July 3, 1933        5 Sheets-Sheet 2

INVENTOR.
Harmon S. Eberhard
BY
ATTORNEY.

Patented Aug. 4, 1936

2,049,643

UNITED STATES PATENT OFFICE 2,049,643

MOTOR VEHICLE

Harmon S. Eberhard, Peoria, Ill., assignor to Caterpillar Tractor Co., San Leandro, Calif., a corporation of California Application July 3, 1933, Serial No. 678,844

17 Claims. (Cl. 305—9)

The present invention relates to track-type tractors, and more particularly to the provision of a simple, sturdy, and reliable mounting for the endless track mechanisms thereof. This application is a continuation in part of my application Serial No. 533,427, filed April 28, 1931.

In this type of tractor, the main frame or body portion of the tractor is supported on a pair of endless track mechanisms arranged longitudinally of the tractor to either side thereof. The truck frames of the endless track mechanisms must oscillate with respect to the main frame as the tractor travels over uneven ground, and hence in mounting the main frame on the truck frames, it becomes necessary to provide for relative movement therebetween. It is also necessary to successful operation of the tractor that the truck frames be confined to vertical oscillation about an axis transverse to the longitudinal axis of the main frame.

A consideration of the heavy work which track-type tractors perform and the operation thereof in turning, makes it apparent that the type of truck frame construction and mounting is very important. In turning such tractors, one of the endless track mechanisms is locked, while the other drives, and, as a result, the locked track mechanism is twisted on the ground. Thus severe stresses are transmitted through the truck frames to the main frame. Severe stresses are also placed on the truck frames when draft is transmitted through the truck frames and not through the drawbar. Normally the implement associated with the tractor is at the rear, and draft is transmitted through the drawbar, but when the implement is placed in front of the tractor, as in bulldozing, push bars are mounted on the truck frames to transmit the draft to the implement. In other forms of mounting for bulldozers and the like implements, the push bars therefrom extend to the rear of the tractor and are connected to the drawbar, guide plates being provided between the push bars and the front ends of the truck frames. In this type of mounting, while draft is transmitted from the tractor drawbar, it is seen that all side thrust on the implement is applied at the front ends of the truck frames. It is believed obvious that under these conditions, it is essential to provide a truck frame construction and mounting which are capable of withstanding unusually heavy stresses, and that the provision thereof is a problem of major importance in building track-type tractors.

In order to obtain these results, it is necessary to provide truck frame constructions which will not twist or weave, and which are connected to the main frame to maintain accurate alignment thereof, while providing ample space for the final drive housings in their most advantageous location, i. e., rigidly attached directly to the sides of the transmission case.

The construction disclosed herein meets the requirements noted above and provides a truck frame construction capable of receiving and transmitting bending moments and stresses at the axis of connection of the truck frames and main frame. At the front, the main frame is supported on the truck frames by an equalizer spring having its ends free for relative lateral sliding movement with respect to the truck frames. Each truck frame is substantially Y-shaped and the forked rear end thereof embraces the associated final drive housing and a part of the transmission case or main frame. One of the extensions of the truck frame extends straight to the pivot shaft, while the other diverges inwardly to engage the pivot shaft, providing a diagonal brace of double truss structure which resists tension, compression, and torsion stresses effectively.

Statement of invention

It is an object of the invention to provide a track-type tractor of simple and sturdy construction which is adapted to withstand severe use, and can transmit thrust through the truck frames to an implement connected thereto.

Another object of the invention is to provide an improved track mechanism for a track-type tractor.

Another object of the invention is to provide an improved frame for the track mechanism of a track-type tractor.

Another object of the invention is to provide improved means for mounting the track mechanism on a track-type tractor.

Another object of the invention is to provide a frame suspension for track-type tractors wherein stresses from the main frame to the truck frames, and vice versa, are applied advantageously.

Another object of the invention is to provide a track-type tractor including truck frames whose position with respect to the tractor is controlled solely by the pivotal connections thereof with the tractor main frame.

Another object of the invention is to provide a track-type tractor including truck frames of a sturdy and rigid construction.

Another object of the invention is to provide a track-type tractor including truck frames having a single stress-transmitting connection with an integral portion of the main frame.

Another object of the invention is to provide a Y-shaped truck frame construction for track-type tractors, the open ends of each frame embracing a final drive mechanism.

Another object of the invention is to provide a track-type tractor truck frame of a rigid, trussed construction.

Another object of the invention is to provide a truck frame comprising a central casting and a second casting secured thereto to provide a diagonal brace.

Another object of the invention is to provide a truck frame comprising a diagonal brace of substantially tubular shape.

Another object of the invention is to provide a truck frame comprising a diagonal brace which is effective to resist tension, compression and torsion stresses.

Another object of the invention is to provide a track-type tractor adapted to have an implement connected to the truck frames thereof.

Another object of the invention is to provide a track-type tractor having integral mounting stations on the truck frames thereof for attaching mounting means for an implement.

Another object of the invention is to provide a track-type tractor-implement combination in which stresses from the implement are received through the truck frames of the tractor.

Another object of the invention is to provide a track-type tractor-implement combination in which the implement is mounted in front of the tractor and the implement push bars are connected to the truck frames of the tractor.

Another object of the invention is to provide a track-type tractor having fixed and movable mounting stations on the truck frames thereof adapted to receive mounting means for an auxiliary mechanism.

Other objects will appear as the description progresses.

Description of figures

Figs. 1-8 illustrate one form of truck frame construction and mounting.

Fig. 6 is a rear end view of the tractor illustrating the method of mounting the truck frames thereon.

Figs. 9-11 illustrate a second form of truck frame construction.

Figs. 12-14 illustrate a third form of truck frame construction which includes means for mounting auxiliary implements on the tractor.

Description of mechanism

The tractor (Figs. 1 and 2) includes the main frame, comprising transmission case 4 and crankcase 6 secured thereto, mounted upon a pair of opposite truck frames. The truck frames (Fig. 2) are provided with aligned pivotal connections with the main frame on shafts 2 at the rear end, and the main frame is supported thereon at the front by equalizer spring 12. The suspension of the main frame on the truck frames is described more specifically hereinafter.

Each truck frame (Fig. 4) comprises side channels 10, 20, central member 30 and bracket 40, which are described in detail hereinafter. Side channels 10, 20, extend forwardly to carry front idler 1 (Figs. 1 and 3) which is mounted in member 62 slidable upon the truck frame. Side channel 20 and bracket 40 (Fig. 4) extend rearwardly and have respective pivotal connections 20, 21, 41, with shaft 2 in case 4. Adjacent the rear end of each truck frame, driving sprocket 3 (Figs. 1 and 4) is mounted in a manner later described, and is driven by final drive mechanism in final drive housing 9 suitably secured to transmission case 4. Track 5 passes around front idler 1 and sprocket 3, and has track rollers 87 (Fig. 1) bearing on the ground stretch thereof, while the upper stretch is supported on track carrier rollers 91, 92, mounted on member 62 and housing 79, respectively.

Figure 3:
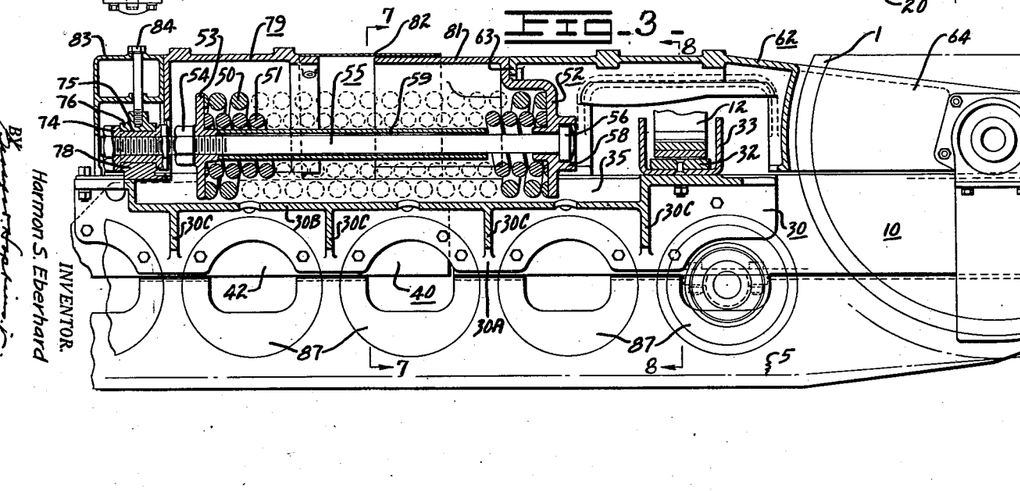
Fig. 3 is a vertical longitudinal section through the central portion of the truck frame.
Figures 4, 5:
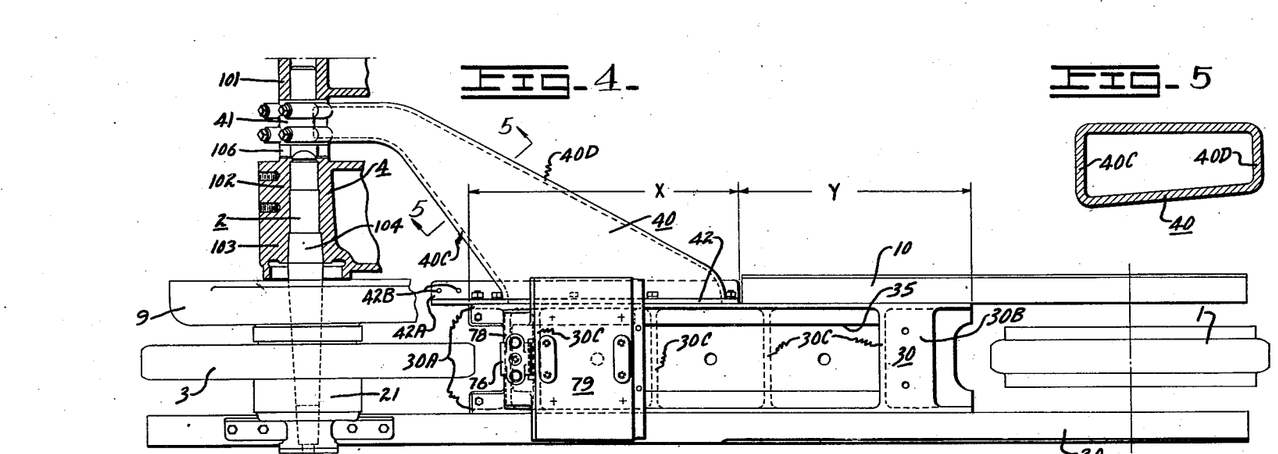
Fig. 4 is a plan view of the truck frame with parts omitted, the inner mounting of the truck being illustrated as a horizontal section on the axis of the driving sprocket, indicated on line 4—4 in Fig. 6.
Fig. 5 is a detailed section on the line 5—5 in Fig. 4.

The truck frame is designed to receive a recoil spring assembly (Fig. 3) which urges idler 1 forwardly to maintain proper tension on track 5 and to permit idler 1 to recoil from track 5, in case the track becomes clogged. For this purpose central member 30 is formed with recess 35 (Figs. 3 and 4). Recoil springs 50, 51, arranged one within the other and oppositely wound are retained between a head 52 and a washer 53 which is retained by nut 54 on bolt 55. Square head 56 of bolt 55 fits in a square aperture in boss 58 on head 52 which prevents bolt 55 from turning. Sleeve 59 is loose on bolt 55 and serves to limit the amount of compression of springs 50, 51, by contact of its ends with suitable bosses on washer 53 and head 52, respectively. As shown in Fig. 3, these springs are extended to the fullest extent permitted by head 52 and washer 53, which are prevented from moving farther apart by bolt head 56 and nut 54. The recoil springs are constantly under compression, the normal amount of compression being determined by the position of nut 54 on bolt 55.

Figures 1, 2:
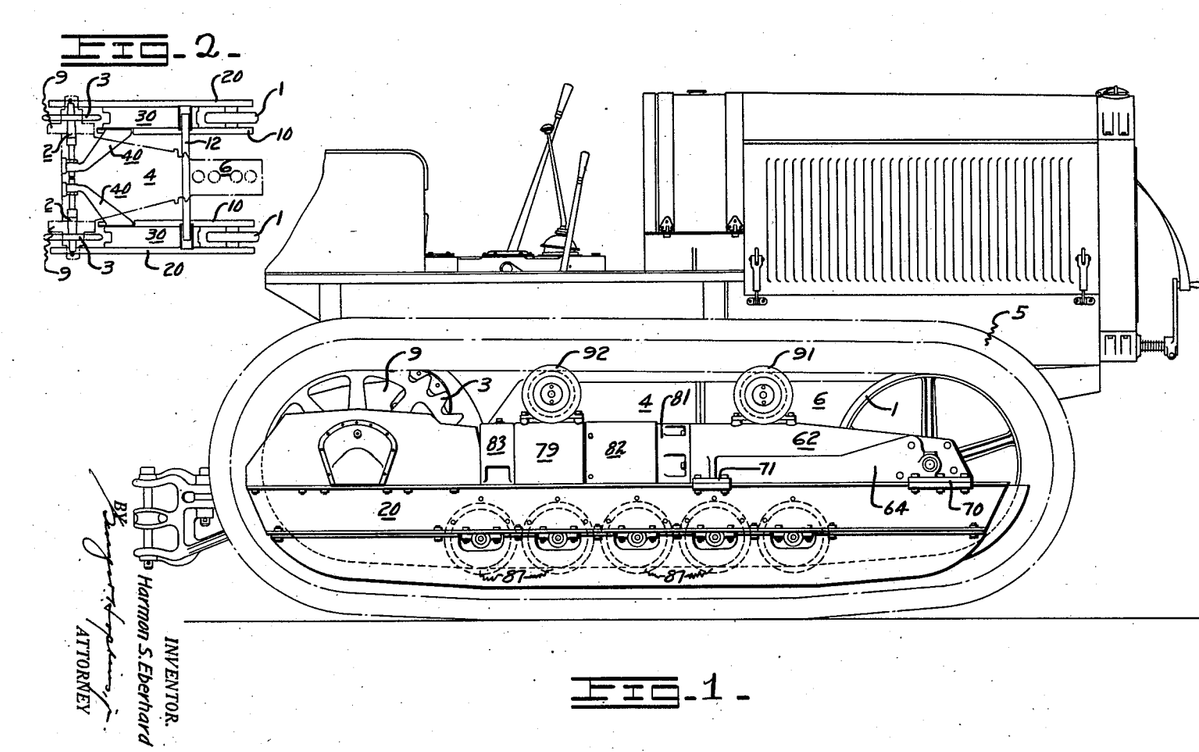
Fig. 1 is a side elevation of a tractor equipped with track mechanism, embodying the instant invention.
Fig. 2 is a diagrammatic plan view of the tractor.

The support of front idler 1 is connected to head 52 for movement therewith. For this purpose, member 62 (Fig. 3) has flange 63 by which it is secured to head 52 by suitable fastening bolts (Fig. 1), and member 62 has similar forwardly extending arms 64 (Fig. 3) which receive the shaft of idler 1. Member 62 is a hollow body as indicated in Fig. 3, and the central portion thereof serves as a housing for the inner end of equalizer spring 12. Said member 62 is adapted to slide upon side channels 10, 20, and to guide member 62 in this sliding movement, it is provided on each side with spaced guides 70, 71 (Fig. 1). Each guide (Fig. 8) has an inwardly extending flange which underlies the outwardly extending web of the side channel. Thus member 62, together with idler 1 and head 52, is adapted to slide as a unit along the truck frame, the spaced guides insuring accurate alignment thereof.

Means are provided for fixing the normal position of member 62 and idler 1 with respect to the truck frame. The rear end of bolt 55 has headed sleeve 74 threaded thereon which is made of hexagonal stock with the central portion turned at 75 to fit in a bearing formed by base 78 integral with housing 79 and cap 76. After loosening cap 76, sleeve 74 may be turned to shift bolt 55 axially, thereby adjusting idler 1 to its normal position.

Housing 79 (Fig. 3) covers the rear end of the recoil spring assembly, and head 52 has portion 81 which extends rearwardly toward housing 79 to cover the forward end of the assembly. Extension shield 82 is secured to the forward end of housing 79 and overlaps housing 81, housing 81 being free to slide in and out of shield 82. Rearwardly of housing 79, cover 33 is provided for adjusting sleeve 74, being secured by cap screw 84 and cap 76. In this manner the recoil spring mechanism is entirely enclosed in the truck frame and the telescoping housing mounted thereon.

The construction of the truck frames will now be described, and as they are similar, only one frame will be described in detail. The truck frame comprises a rigid trussed structure which is substantially Y-shaped (Fig. 4). The open end of the Y provides a space between portions of the truck frame for securing a compact and direct final drive arrangement for the drive sprocket on the transmission case, and provides two spaced bearing connections for the truck frame with the transmission case, the pivotal axis of the bearing connections being coincident with the axis of the final drive mechanism. The truck frame is so constructed that the pair of spaced bearing connections thereof with the transmission case maintain the truck frame in accurate alignment with the longitudinal center line of the tractor and permit vertical oscillation only of the truck frame about the axis of its pivotal connection. Furthermore, as pointed out more specifically hereinafter, the stresses applied to the truck frame are transmitted along a substantially horizontal line to an integral portion of the massive transmission case which forms the backbone of the tractor. In this connection it is to be noted that in a fifteen ton track-type tractor between four and five tons of the weight are in the transmission case.

Figures 7, 8, 9:
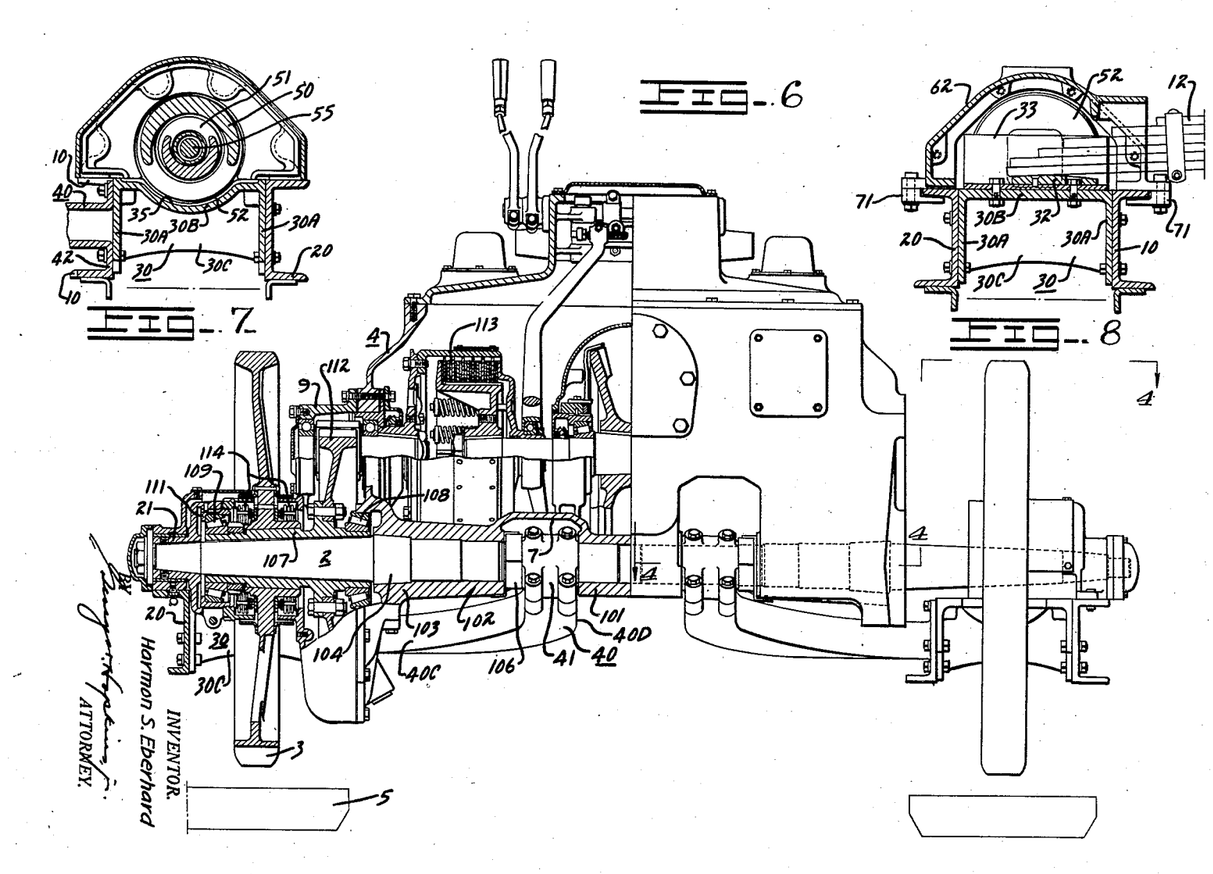
Fig. 7 is a vertical transverse section on line 7—7 of Fig. 3.
Fig. 8 is a vertical transverse section on line 8—8 of Fig. 3.
Fig. 9 is a plan view.
Figure 9:
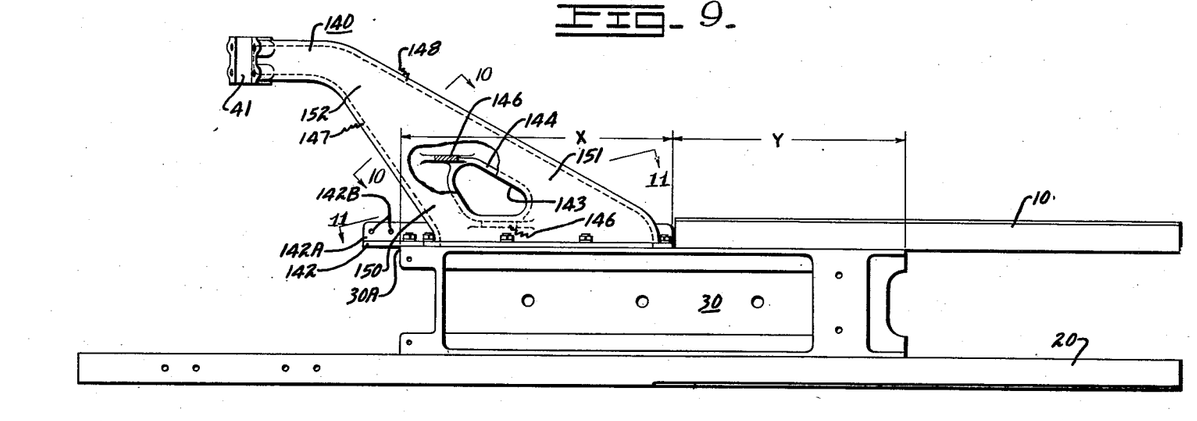

The truck frame is fabricated by securing short inner channel bar 10 (Fig. 4) and long outer channel bar 20 to a central member 30. Member 30 (Figs. 3, 4, and 7) comprises an integral casting including side walls 30A joined to each other and to top wall 30B by a plurality of transverse webs or stiffening members 30C. Said webs 30C (Fig. 3) are located throughout the length of member 30 between respective adjacent track rollers 87 and extend below the tops thereof. As shown in Figs. 3 and 7, top wall 30B of member 30 is recessed at 35 to receive recoil springs 50, 51. At the front, top wall 30B has an end of equalizer spring 12 resting freely thereon (Figs. 3 and 8) in channel 33 on seat 32. This equalizer is described in detail in the patent to Best, No. 1,715,055, dated May 28, 1929.

It is seen, therefore, that the body portion of the truck frame comprises a box-like trussed structure which is of a sturdy and rigid construction and will transmit stresses therethrough without distortion or weaving. The inward extension of the truck frame which, together with the rear end of channel 20, forms the open end of the Y, comprises bracket 40 (Fig. 4) secured to casting 30 adjacent inner side channel 10, for which purpose it is provided with flange 42. It is to be noted that flange 42 contacts the inner wall 30A of casting 30 for a distance $x$ which is greater than distance $y$ as indicated in Fig. 4. Bottom flange 42A is apertured at 42B to provide mounting means for an end of rearmost track roller 87.

Bracket 40 comprises an integral casting (Figs. 4 and 5) having a rectangular cross section which is greatest at the outer end of the casting (Fig. 4) and converges as the casting extends inwardly and upwardly to bearing 41 on shaft 2. Side walls 40C, 40D, lead from the rear end of casting 30 and an intermediate portion thereof rearwardly to bearing 41. Said side walls 40C, 40D together with adjacent portions of the top and bottom walls form channel-like converging truss members to give the brace rigidity. Due to the length of contact of bracket 40 with central casting 30, which serves to space side walls 40C, 40D a substantial distance apart, in effect a double truss from the central casting 30 to shaft 2 is formed, thereby providing the required strength and rigidity at this point. It is to be noted that the bracket comprising the diagonal brace is substantially tubular in form whereby a trussed structure is provided which is effective as a tension, compression, or torsion member.

From the foregoing description it is seen that the truck frame is made up of four pieces, namely, the central member, having two side channels secured thereto and arranged substantially parallel to each other, both channels extending forwardly from the central member, the outside channel member extending rearwardly from the central member, and a bracket which extends from the central member inwardly to a bearing on the shaft on which the truck pivots.

The pivotal connection of the truck frame to the transmission case comprises two spaced bearings which must withstand all the stresses and bending moments incident to operation of the tractor. These spaced bearings are located at a point above the bottom of the transmission case whereby stresses are transmitted directly to such case which forms the main frame of the tractor. The space between the bearings is utilized to provide a simple, compact and direct final drive for the driving sprocket.

Shaft 2 (Figs. 4 and 6) has its inner end supported in boss 101 of transmission case 4, and is supported intermediate its ends in bosses 102, 103, of said transmission case. Boss 103 is tapered to receive tapered portion 104 of shaft 2 which is securely fastened in the transmission case by nut 106 positioned adjacent bearing 41 in recessed portion 7 of transmission case 4. Shaft 2 extends outwardly through final drive housing 9 where it is pivotally connected at 21 to outer channel 20 of the truck frame. Said shaft 2 is a dead shaft and passes freely through quill 107 mounted in bearing 108 in transmission case 4, and bearing 109 in member 111 which is secured to shaft 2. Quill 107 carries gear 112 within final drive housing 9 which is driven through suitable gearing from steering clutch 113 within transmission case 4, and exteriorly of housing 9, quill 107 carries sprocket 3. To prevent the entrance of deleterious matter, seals 114 are provided on either side of sprocket 3 to protect the joint between sprocket 3 and final drive housing 9 and member 111, respectively.

From the foregoing description it is seen that a very compact and simple drive connection is provided from the driving mechanism in transmission case 4 and the final drive sprocket, and it is to be noted that this structure includes only two seals, one on each side of the sprocket. The provision of such a final drive mechanism at this point between the transmission case and the truck frame, and lying substantially in the same plane, as well as the lowering of the transmission case so that a portion thereof lies between the pair of truck frames to receive stresses therefrom, is enabled by the provision of the forked rear end of the truck frame and the rigid construction thereof which eliminates the necessity of other bearing connections with the pivot shaft and provides for the direct transmission of stresses to the outside of the truck frames and in a substantially horizontal plane from the point of application of the stresses to the transmission case.

Figures 10, 11:
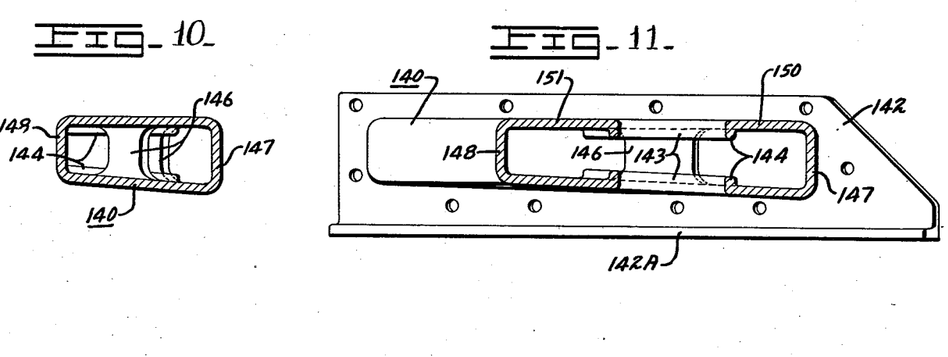
Fig. 10 is a detailed section on the line 10—10 in Fig. 9.
Fig. 11 is a detailed section on the line 11—11 in Fig. 9.

Figs. 9-11 illustrate a second form of truck frame construction. This form is generally similar to that shown in Fig. 4, and reference is hereby made to the description of that structure for parts not specifically described therein.

The truck frame comprises a rigid trussed structure which is substantially Y-shaped, being connected to the transmission case in the same manner as the form shown in Fig. 4. The truck frame includes short inner channel bar 10 and long outer channel bar 20 which are secured to central casting 30. These parts are identical with those shown in Fig. 4 and are not described in detail. Bracket 140 is secured to casting 30 adjacent inner side channel 10, for which purpose it is provided with flange 142. It is to be noted that flange 142 contacts inner wall 30A of casting 30 for a distance of X which is greater than the remaining length Y of the casting. Bottom flange 142A is apertured at 142B to provide mounting means for an end of rearmost track roller 87 similarly to bracket 40 described hereinbefore.

Bracket 140 comprises an integral casting (Figs. 9 and 10) having a substantially rectangular cross section which is greatest at the outer end of the casting and converges as the casting extends inwardly and upwardly to its bearing on the pivot shaft. Centrally of bracket 140 adjacent member 30, vertical opening 143 is provided through the top and bottom walls of the bracket to permit the escape of dirt, rocks, or other material which is thrown on top of the bracket. Otherwise, such material is caught between bracket 140 and the bottom of the transmission case sometimes causing breakage of one of these parts. Ribs 144 are formed in bracket 140 (Figs. 9 and 11) around openings 143 to strengthen the walls. Adjacent opening 143 (Figs. 9-11) vertical webs 146 brace the top and bottom walls of bracket 140. Side walls 147, 148 of bracket 140, lead from the rear end of casting 30 and an intermediate portion thereof, respectively, rearwardly to bearing 41. Said side walls 147, 148, together with adjacent portions of the top and bottom walls of bracket 140 form in effect spaced channel portions at 150, 151 which converge rearwardly to substantially tubular portion 152. Channel portions 150, 151 in effect form spaced converging truss members which give the brace rigidity, while the substantially tubular construction thereof provides a diagonal brace structure which is effective as a tension, compression, or torsion member.

Figures 12, 13:
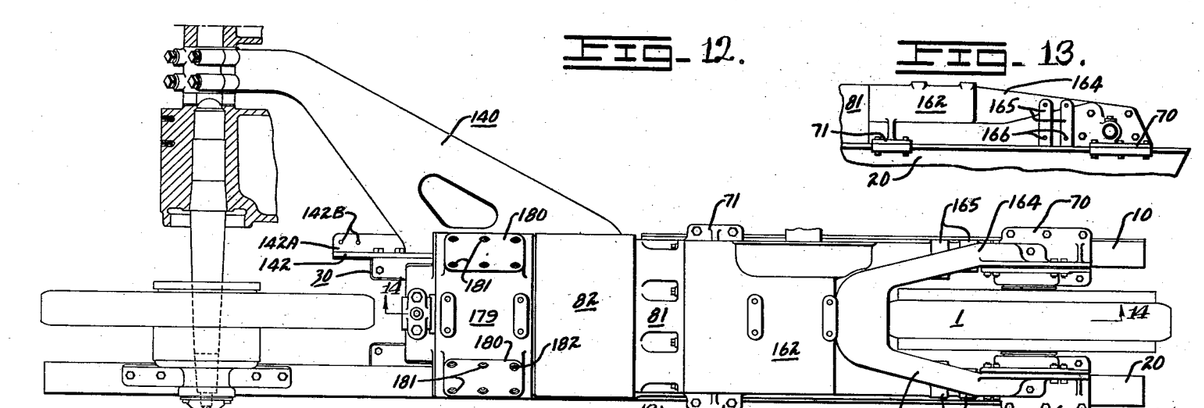
Fig. 12 is a plan view.
Fig. 13 is a fragmentary side elevation taken on the line 13—13 in Fig. 12.
Figure 14:
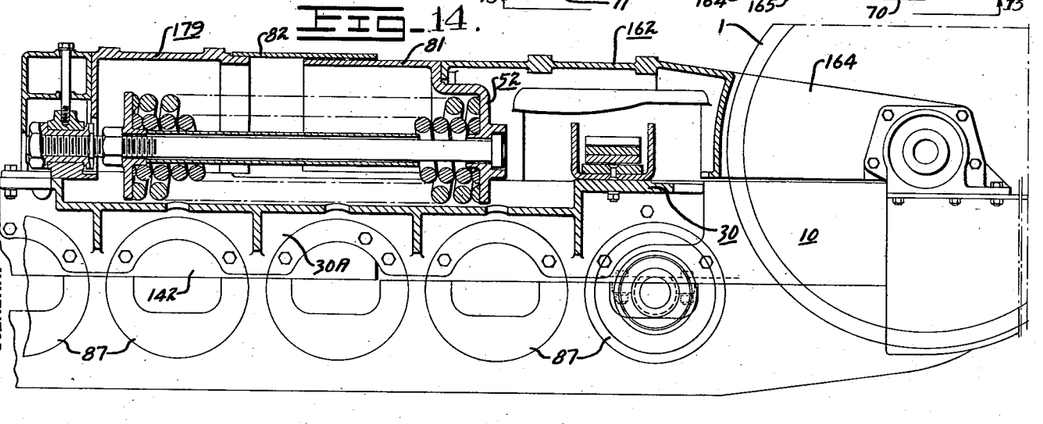
Fig. 14 is a detailed section on the line 14—14 in Fig. 12.

Figs. 12-14 illustrate a third form of truck frame construction which includes means for mounting auxiliary implements on the truck frame, or, optionally, means for mounting thrust receiving members thereon. The body portion of the truck frame construction (Figs. 12 and 14) is similar to that described hereinbefore and includes inner channel 10 and outer channel 20 secured to central member 30, and diagonal brace 140 secured to said member 30.

As described with respect to the structure illustrated in Fig. 3, telescopic housings are provided for enclosing the recoil spring assembly on the truck frame, and such housings are generally similar in construction and function as in the form first described. The movable housing comprising member 162 (Figs. 12 and 14), head 52, and housing 81, which carries front idler 1 is similarly guided in its sliding movement on the truck frame by spaced guides 70, 71, housing 81 telescoping within shield 82 on housing 179 fixed on the truck frame.

Each of the telescoping housings is provided with mounting stations adapted to receive the framework of an auxiliary implement. Housing 179 (Fig. 12) is provided on each side thereof with inclined pads 180 having threaded holes 181 adapted to receive securing means for the auxiliary implement or mechanism. Member 162 (Figs. 12 and 13) is provided adjacent the ends of forward extensions 164 with opposite vertically disposed pads 165 threaded at 166 to receive securing means. When no auxiliary implement or mechanism is mounted on the truck frames, threaded apertures 181 and 166 are closed with threaded plugs 182, one of which is shown in Fig. 12. Thus spaced mounting stations are provided on the truck frames to permit ready assembly of an auxiliary implement on the tractor. It is to be noted that the mounting stations on housing 179 are fixed with respect to the truck frame while the mounting stations on member 162 are movable with respect thereto. It is also to be noted that opposite spaced guides 70, 71 insure accurate alignment of member 162 in transmitting thrust to the truck frame.

The mounting stations on the truck frame provide a means for transmitting draft forces from the tractor to a bulldozer, and for mounting auxiliary guides or thrust plates which serve to maintain the implement in parallel relation to the tractor, transmitting side thrusts to the front and of the truck frame. In this type of mounting for an auxiliary implement, all of the stresses incident to operation of the implement are transmitted directly through the truck frames to the main frame of the tractor.

The advantages of providing mounting stations on the truck frames of the tractor so that an auxiliary implement or mechanism can be mounted thereon are believed obvious in that the implement can be mounted or taken off of the tractor in a short time and with comparative ease, and in that the construction of the mounting means is simplified substantially. It is also apparent, as pointed out in the introduction, that where an implement is mounted in this manner so that the truck frames of the tractor must transmit draft and receive severe tension, compression, and torsion stresses, that a rigid and sturdy truck frame construction and mounting of the character disclosed herein is essential to successful operation of the tractor-implement combination.

Therefore, I claim as my invention:

1. In a vehicle, a track mechanism therefor, comprising an endless track, wheels within said track, a frame to support said wheels comprising a central body member, channel members secured to each side of said body member, and a bracket secured to one side of and extending away from said body member, said bracket having a flange arranged to form a continuation of the flange of one of said channel members.

2. In a track-type tractor, a transmission case, pivot means mounted in an integral part of said case, and a pair of opposite truck frames journaled on said pivot means, said case having a portion extending below the tops of said truck frames, each truck frame comprising a longitudinal body portion including opposite longitudinal side members, and a plurality of transverse members connecting said side members, and a diagonal brace having an end secured to said body portion along a substantial portion of the length thereof and having converging side walls and transverse walls united to said side walls.

3. In a track-type tractor having a tractor body, a truck frame forked at one end to provide extensions, one of said extensions being adapted to extend longitudinally of said tractor body for hinged connection thereto and the other of said extensions comprising a tubular member extending diagonally with respect to said one extension for hinged connection to said body at a point spaced from the hinge connection for said one extension.

4. In a track-type tractor, a truck frame comprising a casting having longitudinal walls and vertical transverse walls, and a second casting having a wide end secured to one of said longitudinal walls, said second casting diverging from said first casting to provide a forked end for said truck frame.

5. In a track-type tractor, a Y-shaped truck frame having its forked end portions adapted for hinged connection to the body of the tractor, comprising a casting forming a body portion, and a second casting forming a diagonal brace.

6. In a track-type tractor, a truck frame comprising side portions, transverse bracing webs joining said side portions, and extensions for hinged connection to the body of the tractor, one of said extensions comprising a substantially tubular member.

7. In a track-type tractor, a truck frame comprising a body portion and a diagonal brace diverging from said body portion, said brace including opposite channel portions converging into a substantially tubular portion.

8. In a track-type tractor, a main frame, a truck frame at each side of said main frame, dead shafting secured to said main frame, each of said truck frames comprising a forked end structure including an inwardly extending rigid tubular brace arm pivotally supported by the shafting for preventing lateral movement of the truck frame and for allowing oscillation thereof in an upright plane transverse to the shafting, each structure being sufficiently strong so as to obviate the necessity of providing means at another portion of each truck frame to cooperate in preventing said lateral movement, and final drive units journaled about the shafting.

9. In a track-type tractor, a truck frame body, a rigid tubular diagonal brace, and means rigidly securing said brace to said truck frame body to provide a forked structure.

10. In a track-type tractor, a truck frame body, a rigid tubular diagonal brace of integral construction from end to end, and means rigidly securing said brace to said truck frame body to provide a forked structure.

11. In a track-type tractor having a frame; a truck frame including a body portion, and means adapting hinging of said truck frame to said tractor frame comprising a brace for transmitting load from said tractor frame and extending diagonally inwardly with respect to said body portion; said brace being of box construction and rigidly secured to said body portion.

12. In a track-type tractor having a frame; a truck frame including a body portion, and means adapting hinging of said truck frame to said tractor frame comprising a brace extending diagonally inwardly with respect to said body portion; said brace being a tubular member rigidly secured to said body portion.

13. In a track-type tractor, a main frame having final drive mechanism at each side of said main frame and rotatable about an axis, a truck frame including a body portion at each side of said main frame; and means for connecting each truck to said main frame at only two spaced points for pivotal movement about said axis, comprising a two prong forked structure, one of said prongs having a load transmitting connection with said main frame and extending diagonally inwardly with respect to the longitudinal axis of said truck frame to provide wide spacing between said prongs for accommodating the final drive mechanism therebetween, said diagonally extending prong having an end portion rigidly secured against a side of said body portion along a substantial portion of the length thereof and non-parallel sides converging with respect to each other from adjacent said end portion to provide adequate bracing means.

14. In a track-type tractor, a main frame having final drive mechanism at each side of said main frame and rotatable about an axis, a truck frame including a body portion at each side of said main frame; and means for connecting each truck to said main frame at only two spaced points for pivotal movement about said axis, comprising a two prong forked structure, one of said prongs having a load transmitting connection with said main frame and extending diagonally inwardly with respect to the longitudinal axis of said truck frame to provide wide spacing between said prongs for accommodating the final drive mechanism therebetween, said diagonally extending prong being a casting of box construction having a rigid connection with the body portion of said truck frame along a substantial portion of the length thereof to provide adequate bracing means.

15. In a track-type tractor, a main frame having final drive mechanism at each side of said main frame and rotatable about an axis, a truck frame including a body portion at each side of said main frame; and means for connecting each truck to said main frame at only two spaced points for pivotal movement about said axis, comprising a two prong forked structure, one of said prongs having a load transmitting connection with said main frame and extending diagonally inwardly with respect to the longitudinal axis of said truck frame to provide wide spacing between said prongs for accommodating the final drive mechanism therebetween, said diagonally extending prong being a tubular member to provide adequate bracing means.

16. In a track-type tractor having a body; a truck frame including a body portion, and means adapting hinging of said truck frame to said tractor body and for precluding lateral displacement of said truck frame comprising a brace extending diagonally inwardly with respect to said body portion; said brace being substantially of tubular box construction and having non-parallel sides converging toward each other from adjacent said body portion.

17. In a track-type tractor having a body; a truck frame including a body portion having sides, and means adapting hinging of said truck frame to said tractor body and for precluding lateral displacement of said truck frame comprising a brace having an elongated end portion secured rigidly against a side of said truck frame body portion and extending diagonally inwardly with respect to said body portion; said brace being substantially of tubular construction and having non-parallel sides converging toward each other from adjacent the end thereof secured to said truck frame body portion.

HARMON S. EBERHARD.